United States Patent
Shimuta et al.

(10) Patent No.: US 9,868,263 B2
(45) Date of Patent: Jan. 16, 2018

(54) APPARATUS AND METHOD FOR SUPPLYING TIRE MATERIAL MEMBERS

(71) Applicant: BRIDGESTONE CORPORATION, Tokyo (JP)

(72) Inventors: Kohei Shimuta, Kurume (JP); Shuzo Hayashi, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/302,218

(22) PCT Filed: Apr. 9, 2015

(86) PCT No.: PCT/JP2015/061132
§ 371 (c)(1),
(2) Date: Oct. 6, 2016

(87) PCT Pub. No.: WO2015/159801
PCT Pub. Date: Oct. 22, 2015

(65) Prior Publication Data
US 2017/0028659 A1 Feb. 2, 2017

(30) Foreign Application Priority Data

Apr. 15, 2014 (JP) ................................. 2014-083455
Apr. 15, 2014 (JP) ................................. 2014-083566

(51) Int. Cl.
*B32B 41/00* (2006.01)
*B29D 30/30* (2006.01)

(52) U.S. Cl.
CPC ......... *B29D 30/3042* (2013.01); *B29D 30/30* (2013.01); *B29D 2030/3064* (2013.01)

(58) Field of Classification Search
CPC .................... B29D 30/3042; B29D 2030/3064
(Continued)

(56) References Cited

U.S. PATENT DOCUMENTS 4,792,372 A    12/1988  Alexander et al.
5,248,374 A     9/1993  Shimizu et al.
(Continued)

FOREIGN PATENT DOCUMENTS

CN    101428481 A    5/2009
CN    101541517 A    9/2009
(Continued)

OTHER PUBLICATIONS

International Search Report for PCT/JP2015/061132 dated Jun. 9, 2015 [PCT/ISA/210].
(Continued)

*Primary Examiner* — Michael N Orlando
*Assistant Examiner* — Joshel Rivera
(74) *Attorney, Agent, or Firm* — Sughrue Mion, PLLC

(57) ABSTRACT

A supply apparatus of tire material members includes a feeder that feeds out first and second continuous material members from which first and second material member is to be cut out, respectively, a conveyer that conveys the first and second continuous material members, a cutter that cuts the first and second continuous material members at a cutting position extending perpendicularly to a conveyance direction every time when the first and second continuous material members are conveyed by a predetermined length, a position detector that detects positions of the first and second continuous material members during a conveyance by the predetermined length from the cutting position, and a position adjuster that, during the conveyance by the predetermined length from the cutting position, adjusts conveyance distances of the first and second continuous material members based on the detected positions of the first and second continuous material members.

5 Claims, 8 Drawing Sheets

(58) Field of Classification Search
USPC .......................... 156/64, 350, 351, 378, 379
See application file for complete search history.

(56) References Cited

U.S. PATENT DOCUMENTS

| | | |
|---|---|---|
| 5,385,626 A | 1/1995 | Shimizu et al. |
| 5,904,788 A * | 5/1999 | Kitajima ................ B29D 30/44 |
| | | 156/123 |
| 2009/0293267 A1 | 12/2009 | Slots et al. |
| 2010/0243129 A1 | 9/2010 | Mirto et al. |
| 2010/0294099 A1 | 11/2010 | Van Laar et al. |
| 2016/0101580 A1 | 4/2016 | Mirto et al. |

FOREIGN PATENT DOCUMENTS

| | | |
|---|---|---|
| EP | 0 744 278 A2 | 11/1996 |
| JP | 5-8322 A | 1/1993 |
| JP | 2007-529344 A | 10/2007 |
| JP | 2011-518691 A | 6/2011 |
| JP | 2012-121226 A | 6/2012 |
| WO | WO 2009131451 A1 * | 10/2009 ......... B29D 30/3007 |
| WO | 2013/093765 A1 | 6/2013 |

OTHER PUBLICATIONS

Communication dated Feb. 8, 2017 from the European Patent Office in counterpart Application No. 15780193.7.

Communication dated Jun. 27, 2017, from the State Intellectual Property Office of the P.R.C. in application No. 201580015726.5.

\* cited by examiner

APPARATUS AND METHOD FOR SUPPLYING TIRE MATERIAL MEMBERS

CROSS REFERENCE TO RELATED APPLICATIONS

This application is a National Stage of International Application No. PCT/JP2015/061132, filed on Apr. 9, 2015, which claims priority from Japanese Patent Application Nos. 2014-083455, filed on Apr. 15, 2014, and 2014-083566, filed on Apr. 15, 2014, the contents of all of which are incorporated herein by reference in their entirety.

TECHNICAL FIELD

The present invention relates to an apparatus and a method for supplying tire material members.

BACKGROUND ART

Patent Literatures 1 and 2 listed below disclose apparatuses for supplying tire material members. The apparatus of the Patent Literature 1 includes a mechanism for supplying two continuous preassemblies in parallel along a conveyance direction, a mechanism for cutting the two preassemblies, a mechanism for measuring lengths of the two preassemblies, and a mechanism for compensating a difference of the lengths of the two preassemblies based on the measurement result.

The apparatus of the Patent Literature 2 includes conveyers for conveying tire material members, a shift mechanism for shifting the conveyers horizontally with respect to a drum, and a swing mechanism for swinging the conveyers to shift front ends of the conveyers vertically with respect to an outer circumferential surface of the drum. By the shift mechanism and the swing mechanism, the tire material members are wound around the drum from the conveyers in a state where the front ends of the conveyers are contacted with the outer circumferential surface of the drum.

PRIOR ART DOCUMENT

Patent Literatures

Patent Literature 1: Japanese Translation of PCT International Application Publication No. 2011-518691
Patent Literature 2: Japanese Patent Application Publication No. 2012-121226

SUMMARY OF INVENTION

The compensation by the compensation mechanism of the Patent Literature 1 may not be able to compensate sufficiently, if the difference of the lengths of the two preassemblies are relatively large. Especially, there is a case where the two preassemblies are attached to one and another sides of a tire width direction on a single tire. In such a case, if the lengths of the two preassemblies are different from each other, kinetic performance and uniformity performance of the tire may be affected. Therefore, it is preferable that the two preassemblies have the same lengths.

Positional adjustment of the tire material members by the shift mechanism and the swing mechanism of the Patent Literature 2 may become complicated. Generally, when winding a tire material member(s) around a drum, a position of the tire material member(s) with respect to the drum is important. Therefore, it is desired to improve accuracy of positional relation between the drum and the front ends of the conveyers from which the tire material members are fed toward the drum (i.e. a gap between the front ends of the conveyers and the drum).

Therefore, an object of the present invention is to provide an apparatus and a method for supplying tire material members that can improve accuracy for supplying the tire material members.

A first aspect of the present invention provides an apparatus for supplying tire material members, the apparatus comprising: a feeder that feeds out a first continuous material member from which a first material member is to be cut out and a second continuous material member from which a second material member is to be cut out; a conveyer that conveys the first continuous material member and the second continuous material member; a cutter that cuts the first continuous material member and the second continuous material member at a cutting position along a crossing direction perpendicular to a conveyance direction of the first continuous material member and the second continuous material member every time when the first continuous material member and the second continuous material member are conveyed by a predetermined length; a position detector that detects positions of the first continuous material member and the second continuous material member along the conveyance direction while the first continuous material member and the second continuous material member are conveyed by the predetermined length from the cutting position; and a position adjuster that, while the first continuous material member and the second continuous material member are conveyed by the predetermined length from the cutting position, adjusts conveyance distances of the first continuous material member and the second continuous material member so that positions of downstream ends of the first continuous material member and the second continuous material member are identical to each other along the conveyance direction, based on the positions of the first continuous material member and the second continuous material member along the conveyance direction.

A second aspect of the present invention provides a method for supplying tire material members, the method comprising: feeding out a first continuous material member from which a first material member is to be cut out and a second continuous material member from which a second material member is to be cut out; conveying the first continuous material member and the second continuous material member that are fed out; cutting the first continuous material member and the second continuous material member every time when the first continuous material member and the second continuous material member are conveyed by a predetermined length; detecting positions of the first continuous material member and the second continuous material member along a conveyance direction while the first continuous material member and the second continuous material member are conveyed by the predetermined length from a cutting position; and, while the first continuous material member and the second continuous material member are conveyed by the predetermined length from the cutting position, adjusting conveyance distances of the first continuous material member and the second continuous material member so that positions of downstream ends of the first continuous material member and the second continuous material member are identical to each other along the conveyance direction, based on the positions of the first continuous material member and the second continuous material member.

A third aspect of the present invention provides an apparatus for supplying a tire material member to an assembling mechanism around which the tire material member is to be wound, the apparatus comprising: a conveyer that conveys the tire material member; and a vertical adjuster that adjusts a vertical position of the tire material member on the conveyer by moving the conveyer vertically, wherein the vertical adjuster contacts the tire material member on the conveyer with the assembling mechanism by moving the conveyer upward in a state where a conveyance direction of the conveyer is horizontal.

A fourth aspect of the present invention provides a method for supplying a tire material member to an assembling mechanism around which the tire material member is to be wound, the method comprising: a conveyance step for conveying the tire material member by a conveyer; and a vertical adjustment step for adjusting a vertical position of the conveyer by vertically moving the tire material member conveyed by the conveyer, wherein, in the vertical adjustment step, the tire material member on the conveyer is contacted with the assembling mechanism by moving the conveyer upward in a state where a conveyance direction of the conveyer is horizontal.

DESCRIPTION OF EMBODIMENTS

Figure 1:
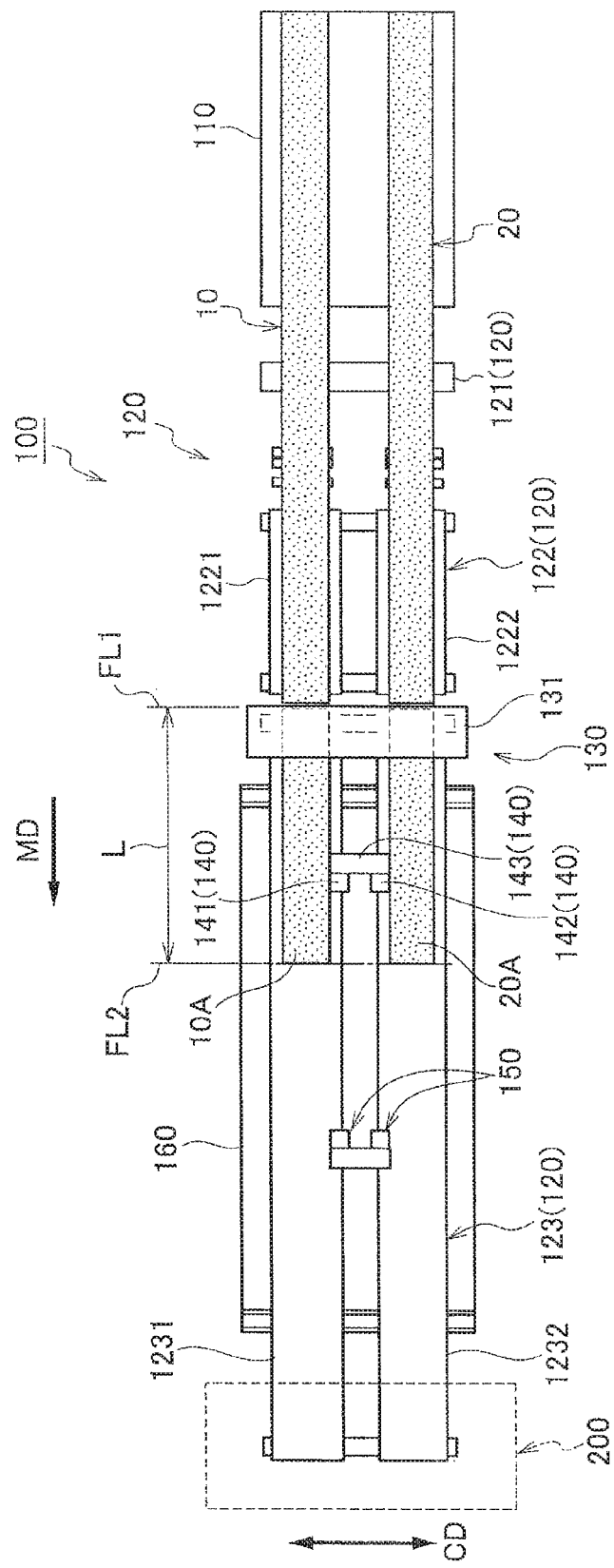
FIG. 1 is a plan view of an apparatus for supplying tire material members.

Embodiments of an apparatus and a method for supplying tire material members will be described with reference to the drawings. Specifically, (1) APPARATUS FOR SUPPLYING TIRE MATERIAL MEMBERS, (2) METHOD FOR SUPPLYING TIRE MATERIAL MEMBERS, (3) FUNCTIONS AND ADVANTAGES, and (4) OTHER EMBODIMENTS will be described.

Note that identical and equivalent components to each other are labelled with identical signs. The drawings show components schematically, so that it should be understood that the components shown in the drawings may not show actual themselves. In addition, actual dimensions of the components and actual ratios between the components may be shown differently in the drawings.

(1) Apparatus for Supplying Tire Material Members

Figure 2:
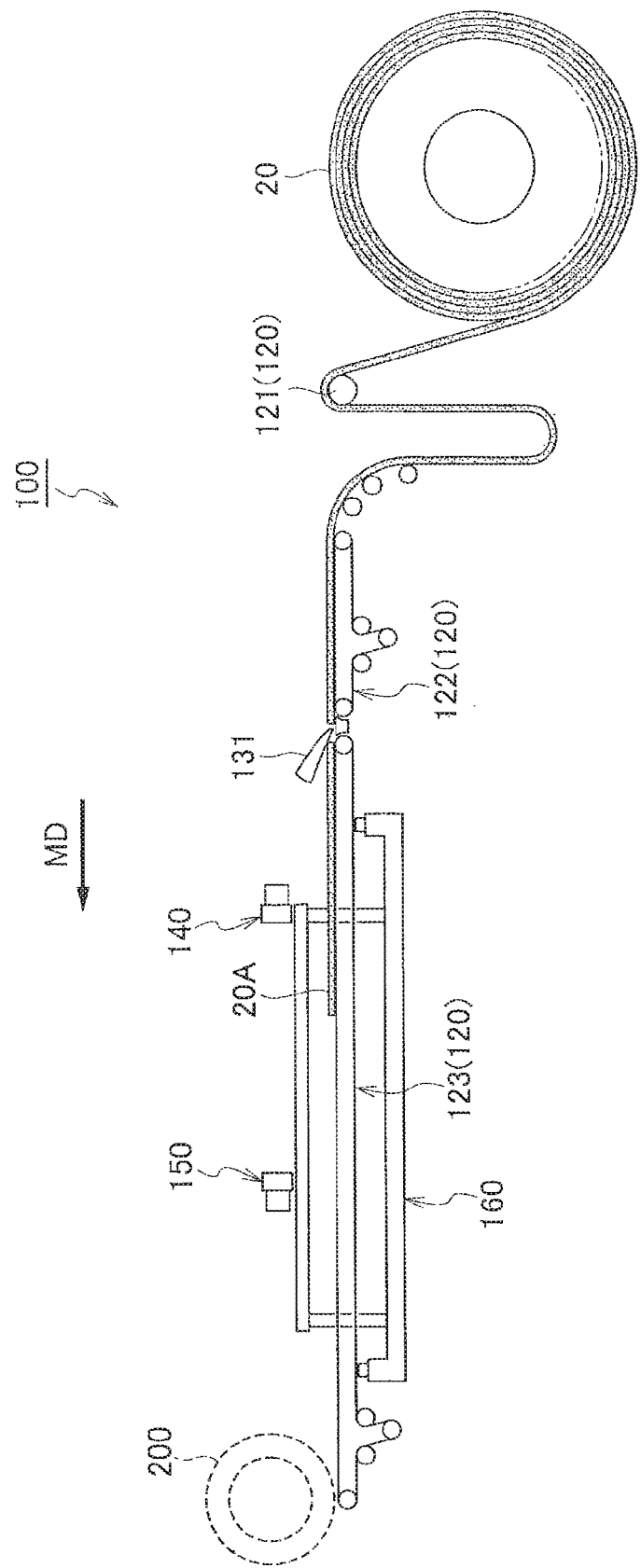
FIG. 2 is a side view of the supply apparatus.

An apparatus for supplying tire material members will be described. As shown in FIG. 1 and FIG. 2, the supply apparatus 100 supplies a first material member 10A and a second material member 20A that serve as tire material members to a drum 200 that serves as an assembling mechanism disposed on a downstream side in a conveyance direction MD. The supply apparatus 100 that configures part of a tire manufacturing apparatus supplies the material members (10A, 20A) that will configure a tire to the drum 200 (an assembling mechanism) that is supported rotatably, and winds the material members (10A, 20A) around the drum 200 to form an unvulcanized tire.

The supply apparatus 100 includes a feeder 110, a conveyer 120, a cutter 130, a position detector 140, a position adjuster, a supplemental position detector 150, a vertical adjuster 170, and a swing mechanism 180. Note that the vertical adjuster 170 and the swing mechanism 180 are not shown in FIG. 2 and plan views (see FIG. 6 to FIG. 8).

The feeder 110 supports a first continuous material member 10 from which the first material member(s) 10A is to be cut out and a second continuous material member 20 from which the second material member(s) 20A is to be cut out, and feeds out the first continuous material member 10 and the second continuous material member 20 to the conveyer 120. The first continuous material member 10 and the second continuous material member 20 are band-shaped members, and being wound to form a roll-shape. The first material member 10A is formed by cutting the first continuous material member 10 to a predetermined length L. Similarly, the second material member 20A is formed by cutting the second continuous material member to the predetermined length L. A continuous direction of the first material member 10A (the second material member 20A) is the conveyance direction MD of the first continuous material member 10 (the second continuous material member 20).

The feeder 110 has a rotatable body around which the first continuous material member 10 and the second continuous material member 20 are wound. The rotatable body is rotatable about its rotational axis, and feeds out the first continuous material member 10 and the second continuous material member 20 by rotating. Since the first continuous material member 10 and the second continuous material member 20 are wound around the single rotatable body, it is easy to make feed-out lengths of the first continuous material member 10 and the second continuous material member 20 identical to each other.

Note that the first continuous material member 10 and the second continuous material member 20 may be fed out by a drive mechanism that rotates the rotatable body, or the first continuous material member 10 and the second continuous material member 20 may be fed out by being pulled by the conveyer 120.

The continuous directions of the first continuous material member 10 and the second continuous material member 20 are parallel to each other along the conveyance direction MD. Therefore, the feeder 110 can make the feed-out lengths of the first continuous material member 10 and the second continuous material member 20 identical to each other. The first continuous material member 10 and the second continuous material member 20 are aligned, with a distance interposed therebetween, along a crossing direction CD perpendicular to the conveyance direction MD.

The conveyer 120 conveys the first continuous material member 10 and the second continuous material member 20 that are fed out from the feeder 110 so that the continuous directions of the first continuous material member 10 and the second continuous material member 20 are made parallel to each other. The conveyer 120 has a feed roller 121, an upstream conveyer 122, and a downstream conveyer 123. The feed roller 121, the upstream conveyer 122, and the downstream conveyer 123 are disposed sequentially in this order from upstream toward downstream along the conveyance direction MD.

The feed roller 121 leads the first continuous material member 10 and the second continuous material member 20, that are fed out from the feeder 110, downstream along the conveyance direction MD. Each of the upstream conveyer 122 and the downstream conveyer 123 has rotary rollers and endless belts wound around the rotary rollers. Note that the upstream conveyer 122 and the downstream conveyer 123 may be configured of only rotary rollers.

The upstream conveyer 122 locates upstream from a cutting position of the cutter 130, and conveys the tire material members to the cutting position. The upstream conveyer 122 has a first upstream conveyer 1221 that conveys the first continuous material member 10, and a second upstream conveyer 1222 that conveys the second continuous material member 20. The conveyance directions of the first upstream conveyer 1221 and the second upstream conveyer 1222 are parallel to each other.

The downstream conveyer 123 locates downstream from the cutting position of the cutter 130. The downstream conveyer 123 has a first downstream conveyer 1231 that conveys the first continuous material member 10 (the first material member 10A), and a second downstream conveyer 1232 that conveys the second continuous material member 20 (the second material member 20A). The conveyance directions of the first downstream conveyer 1231 and the second downstream conveyer 1232 are parallel to each other.

At least one of the upstream conveyer 122 and the downstream conveyer 123 functions as the position adjuster to adjust conveyance distances of the first continuous material member 10 and the second continuous material member 20. Note that the adjustment of the conveyance distances of the first continuous material member 10 and the second continuous material member 20 will be described later in detail.

The cutter 130 cuts the first continuous material member 10 and the second continuous material member 20 at the cutting position extending in the crossing direction CD, every time when the conveyer 120 conveys the first continuous material member 10 and the second continuous material member 20 by the predetermined length L. The cutter 130 is disposed over the first continuous material member 10 and the second continuous material member 20 along the crossing direction CD, and has a cutter blade 131 for cutting the first continuous material member 10 and the second continuous material member 20 together.

The cutter blade 131 is extended along the crossing direction CD, and cuts the first continuous material member 10 and the second continuous material member 20 simultaneously at the cutting position along the crossing direction CD. A virtual line FL that extends in the crossing direction and includes the cutting position of the cutter blade 131 is shown in FIG. 1.

The cutter blade 131 that is driven by a drive mechanism (not shown in the drawings) is waited at a position distanced from the first continuous material member 10 and the second continuous material member 20 at times other than a time of cutting, and is contacted with the first continuous material member 10 and the second continuous material member 20 at a time of cutting to cut out the first material member 10A and the second material member 20A.

Note that the cutter blade 131 may not be provided as a single cutting blade for cutting the first continuous material member 10 and the second continuous material member 20 together, but may be provided so as to include a cutting blade for the first continuous material member 10 and another cutting blade for the second continuous material member 20 that are provided independently from each other.

The position detector 140 detects positions of the first continuous material member 10 and the second continuous material member 20 along the conveyance direction MD while the first continuous material member 10 and the second continuous material member 20 are conveyed by the predetermined length L from the cutting position. The position detector 140 detects a position of a downstream end 10E (see FIG. 3) of the first continuous material member 10 as the position of the first continuous material member 10 along the conveyance direction MD. Similarly, the position detector 140 detects a position of a downstream end 20E (see FIG. 3) of the second continuous material member 20 as the position of the second continuous material member 20 along the conveyance direction MD.

The position detector 140 has a first camera 141 for taking images of the downstream end 10E of the first continuous material member 10, and a second camera 142 for taking images of the downstream end 20E of the second continuous material member 20. The first camera 141 and the second camera 142 are located downstream from the cutter 130. The first camera 141 and the second camera 142 take images of the first continuous material member 10 and the second continuous material member 20 between the virtual line FL1 including the cutting position and a virtual line FL2 positioned downstream from the virtual line FL1 by the predetermined length L.

The position detector 140 may take images of the first continuous material member 10 and the second continuous material member 20 that are being conveyed, or may take images of the first continuous material member 10 and the second continuous material member 20 that are being stopped temporarily at their image-taking positions. In the present embodiment, the position detector 140 takes images of the first continuous material member 10 and the second continuous material member 20 that are being stopped temporarily at the image-taking positions.

The first camera 141 and the second camera 142 are fixed on a single support base 143. Further, the support base 143 is fixed with a support frame 160 that is communally used by the downstream conveyer 123 of the conveyer 120. The first camera 141 and the second camera 142 may be fixed on other support bases separately, and the support base 143 may be fixed independently from the downstream conveyer 123 of the conveyer 120. It is possible to restrict relative positional shifting between the first camera 141 and the second camera 142, and it is possible to restrict relative positional shifting between the first/second cameras 141/142 and the conveyer 120.

Note that the position detector 140 may detect the position of the first continuous material member from its transit time by retrieving the time while the first continuous material member 10 transits at a predetermined point, and may detect a position other than the downstream end 10E of the first continuous material member 10.

The supplemental position detector 150 is located downstream from the position detector 140. The supplemental position detector 150 is a camera(s) for taking images of the first material member 10A that is cut out from the first continuous material member 10 and the second material member 20A that is cut out from the second continuous material member 20. A distance between the image-taking position of the supplemental position detector 150 and the image-taking position of the first camera 141 is the predetermined length L (see FIG. 5). Similarly, a distance between the image-taking position of the supplemental position detector 150 and the image-taking position of the second camera 142 is also the predetermined length L.

The supplemental position detector 150 takes images of the downstream ends of the first material member 10A and the second material member 20A, and the first camera 141 and the second camera 142 take images of the upstream ends of the first material member 10A and the second material member 20A. Therefore, it is possible to judge whether or not the first material member 10A is cut to the predetermined length L based on the image-taking results of the supplemental position detector 150 and the first camera 141. Similarly, it is possible to judge whether or not the second material member 20A is cut to the predetermined length L based on the image-taking results of the supplemental position detector 150 and the second camera 142.

The position detector 140 and the supplemental position detector 150 are sufficient if they can detect a position(s) of an object member (s), and may be a sensor (s) other than a camera(s) (an optical sensor, a contact sensor, or the like).

The position adjuster is configured of a controller (not shown in the drawings) and the conveyer 120. While the first continuous material member 10 and the second continuous material member 20 are conveyed by the predetermined length L from the cutting position, the position adjuster adjusts the conveyance distances of the first continuous material member and the second continuous material member 20 so that, based on the positions of the first continuous material member 10 and the second continuous material member 20 along the conveyance direction MD, the positions of the downstream ends (10E, 20E) of the first continuous material member 10 and the second continuous material member 20 along the conveyance direction MD are located at an identical position to each other.

More in detail, the controller of the position adjuster retrieves, from the position detectors, the lengths of the first continuous material member 10 and the second continuous material member 20 along the conveyance direction MD, and then compares them. While the first continuous material member 10 and the second continuous material member 20 are conveyed by the predetermined length L from the cutting position, the controller adjusts the conveyance distance(s) of the first continuous material member 10 and the second continuous material member 20 based on the above comparison by controlling the conveyer 120. According to this adjustment, the downstream end 10E of the first continuous material member 10 and the downstream end 20E of the second continuous material member 20 can be located at an identical position to each other under the condition where they are conveyed by the predetermined length L from the cutting position.

Figure 6:
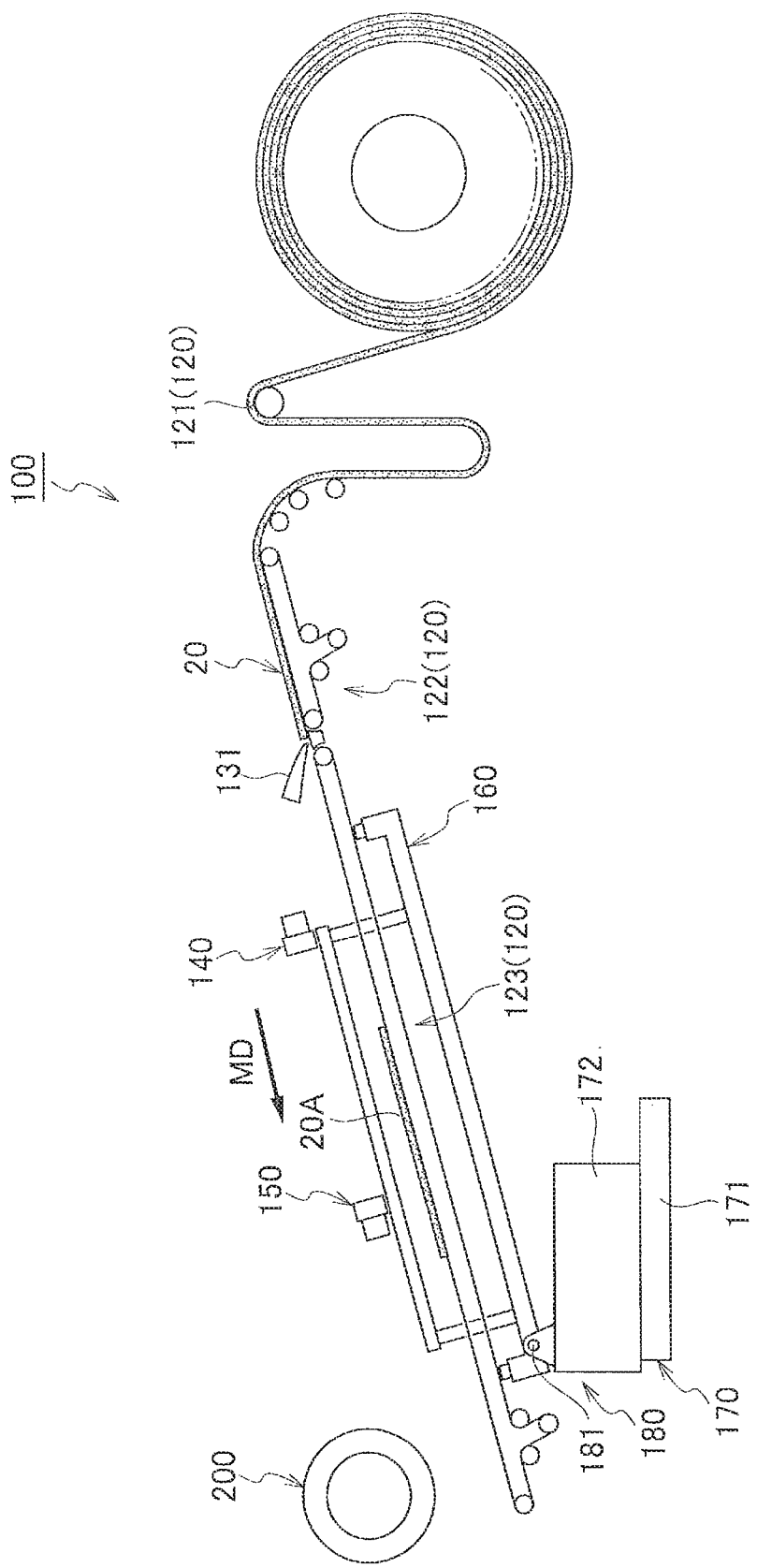
FIG. 6 is a plan view of the supply apparatus (before a conveyance adjustment step).
Figure 7:
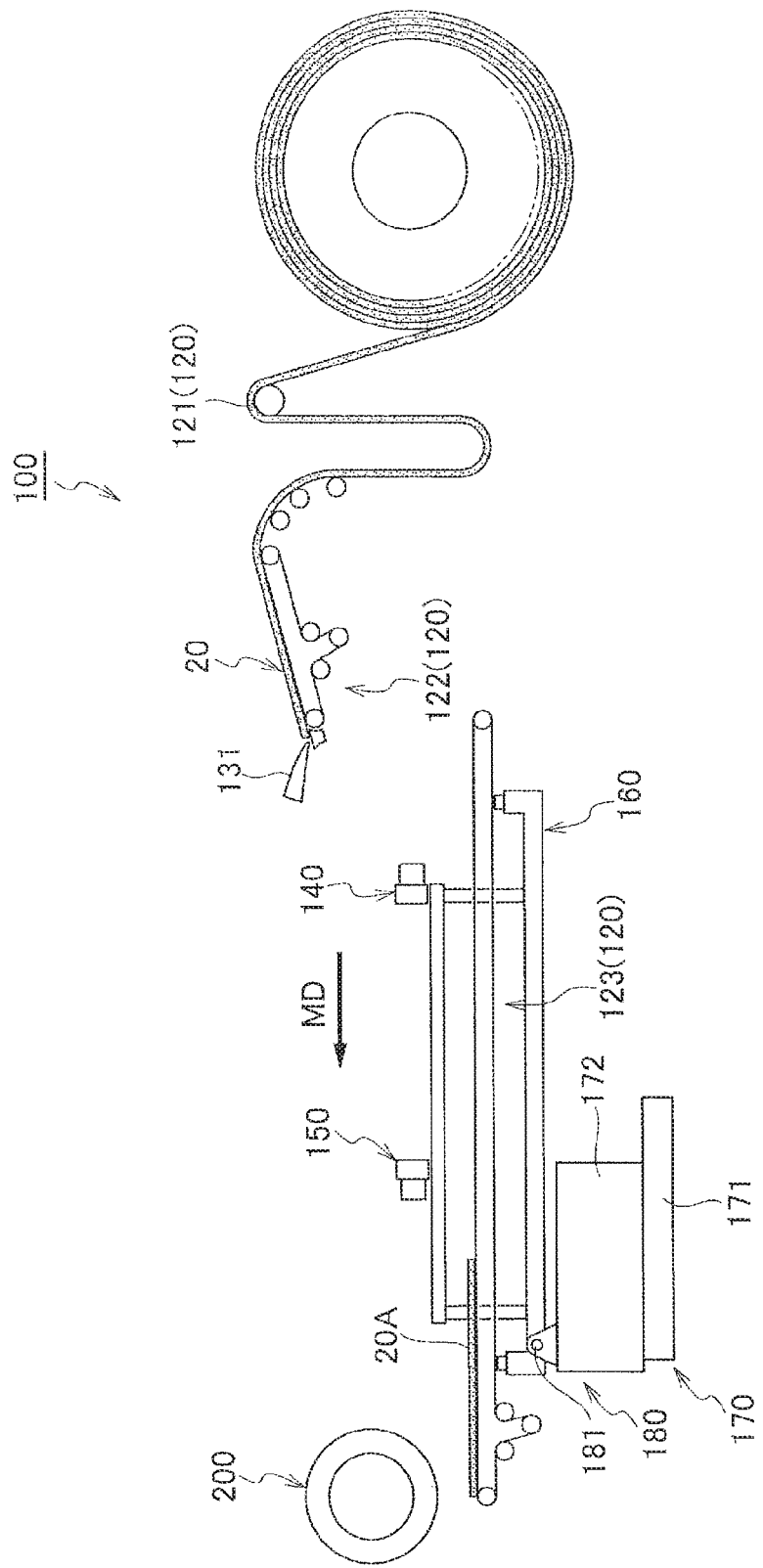
FIG. 7 is a plan view of the supply apparatus (during the conveyance adjustment step: an angle adjustment step).
Figure 8:
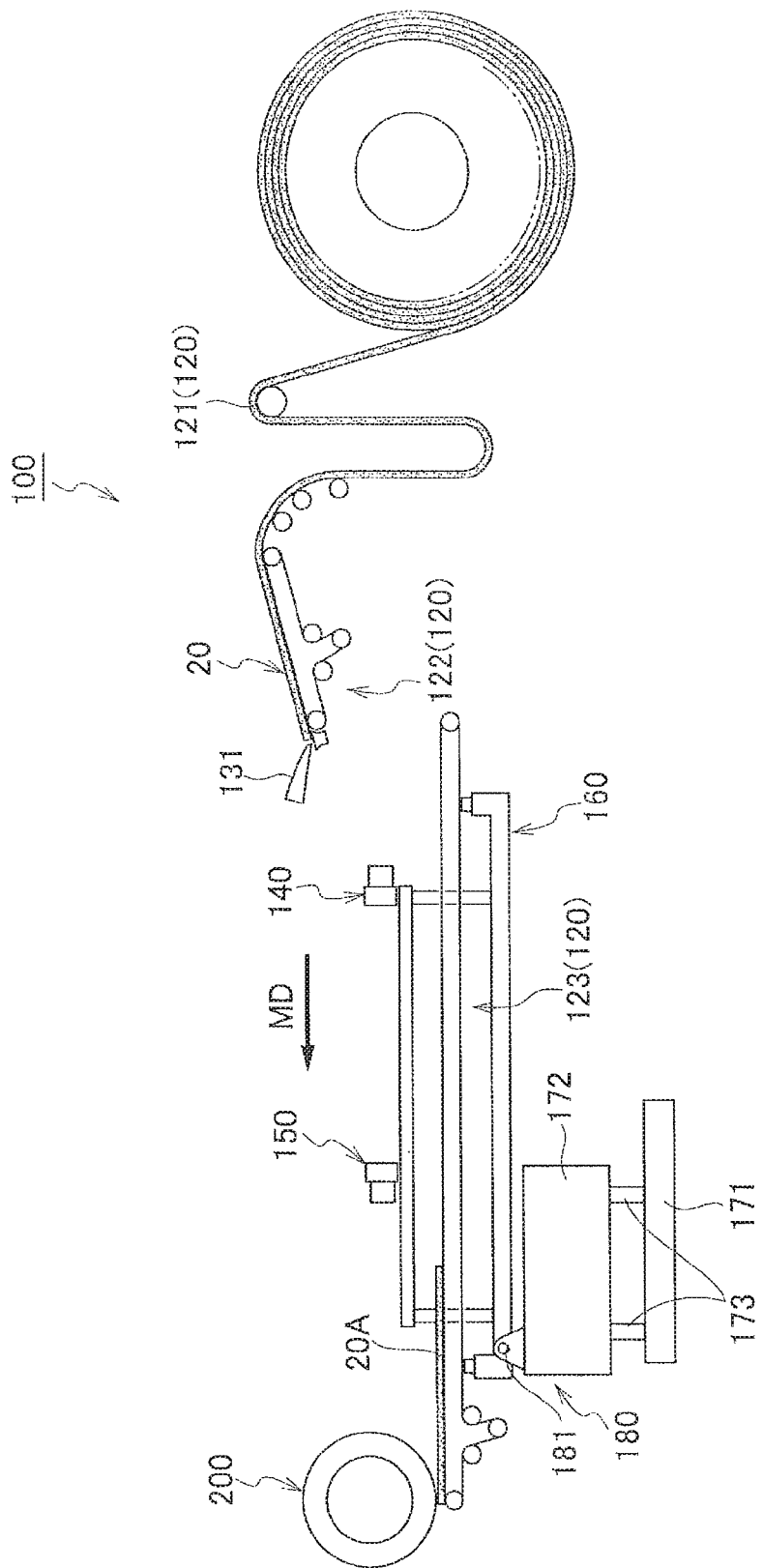
FIG. 8 is a plan view of the supply apparatus (during the conveyance adjustment step: a vertical adjustment step).

The vertical adjuster 170 shown in FIG. 6 to FIG. 8 adjusts a vertical position of the downstream conveyer 123 (the conveyer 120). The vertical adjuster 170 moves the support frame 160 that supports the downstream conveyer 123. The vertical adjuster 170 moves the support frame 160 (the downstream conveyer 123) vertically upward or downward.

The vertical adjuster 170 is disposed beneath the support frame 160. The vertical adjuster 170 moves the downstream conveyer 123 between a contact position (FIG. 8) where the first material member 10A and the second material member 20A on the downstream conveyer 123 are contacted with the drum 200 and a non-contact position where the first material member 10A and the second material member 20A on the downstream conveyer 123 are located beneath the drum 200. The vertical adjuster 170 has a first support base 171, a second support base 172, and a drive mechanism (not shown in the drawings). The first support base 171 is moved vertically along move shafts 173 extending vertically.

In FIG. 7, the downstream conveyer 123 is located at the non-contact position, and the second support base 172 is made abutted on the first support base 171. When the second support base 172 is move upward along the move shafts 173, it comes into a state shown in FIG. 8. In FIG. 8, the downstream conveyer 123 is located at the contact position, and the second support base 172 is made distanced from the first support base 171.

The vertical adjuster 170 makes only a vertical movement, but doesn't make a horizontal movement and a swing movement. Therefore, the vertical adjuster 170 contacts the first material member 10A and the second material member 20A on the downstream conveyer 123 with the drum 200 by moving the downstream conveyer 123 upward in a state where the conveyance direction of the downstream conveyer 123 is horizontal.

The swing mechanism 180 swings the downstream conveyer 123 about a swing axis 181 that is parallel to a rotational axis of the drum 200. The swing axis 181 is extended along the crossing direction CD. The swing mechanism 180 moves a downstream end of the downstream conveyer 123 along a circular arc track in the side views of the supply apparatus 100 shown in FIG. 6 to FIG. 8.

The swing mechanism 180 swings the downstream conveyer 123 between a state where the conveyance direction of the downstream conveyer 123 is horizontal and a state where the conveyance direction of the downstream conveyer 123 is inclined (a state where its upstream end is located above and its downstream end is located below). In FIG. 6, the downstream conveyer 123 is inclined so that the upstream end of the downstream conveyer 123 is made continuous with the downstream end of the upstream conveyer 122. In FIG. 7, the downstream conveyer 123 is made horizontal, so that the upstream end of the downstream conveyer 123 is located beneath the upstream conveyer 122.

(2) Method for Supplying Tire Material Members

A method for supplying tire material members according to the above-described supply apparatus 100 will be described. The supply method according to the present embodiment includes a feed-out step, a conveyance step, a cutting step, a position adjustment step, a position detection step, and a conveyance adjustment step.

In the feed-out step, the feeder 110 continuously feeds out the first continuous material member 10 and the second continuous material member 20 to a downstream in the conveyance direction MD. In the conveyance step, the conveyer 120 conveys the first continuous material member 10 and the second continuous material member 20 that were fed out in the feed-out step so that their continuous direction are made parallel to each other.

In the cutting step, the first continuous material member 10 and the second continuous material member 20 are cut by the cutter 130 at the above-mentioned cutting position, perpendicularly to the continuous direction or to have an inclined angle to the continuous direction, every time when they are conveyed by the predetermined length L. FIG. 1 and FIG. 2 show a state where the first continuous material member 10 and the second continuous material member 20 are cut in the cutting step. The first material member 10A and the second material member 20A that have been cut out are disposed downstream from the cutting position, and the first continuous material member 10 and the second continuous material member are disposed upstream from the cutting position.

Figure 3:
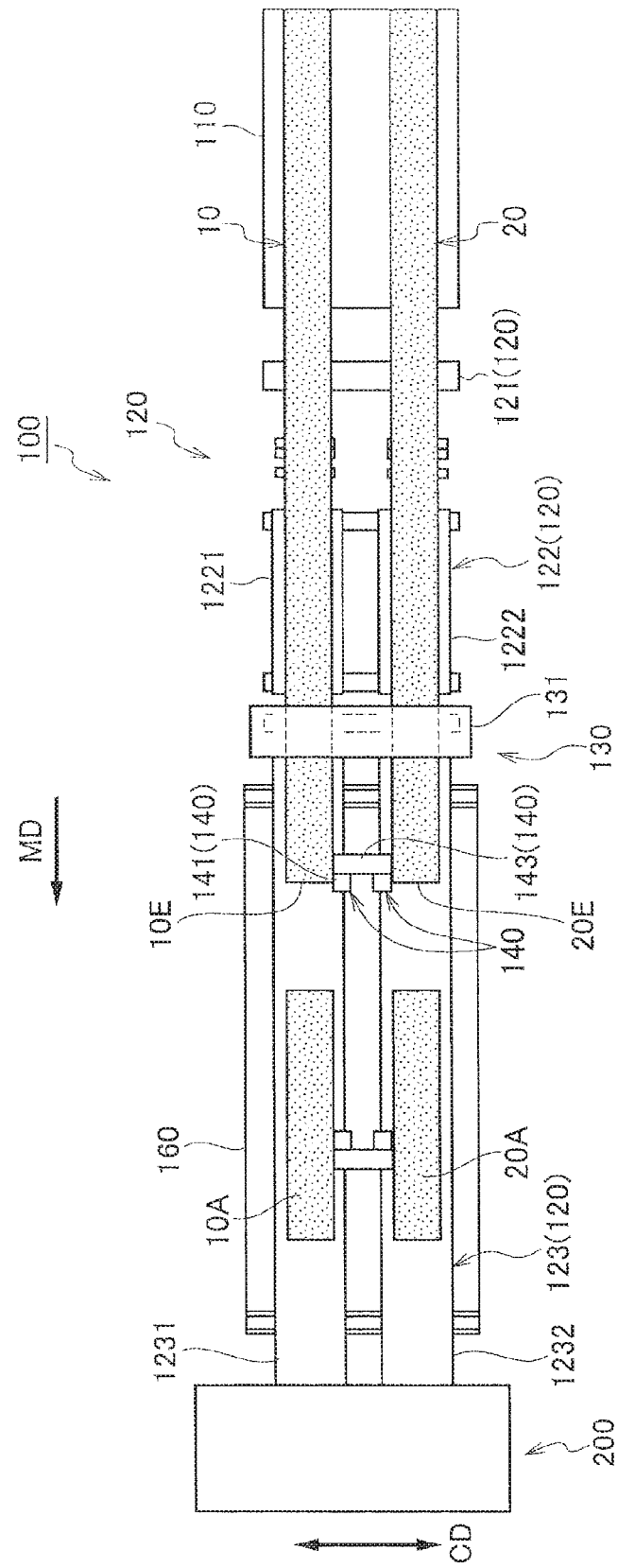
FIG. 3 is a plan view of the supply apparatus (a feed-out step—a conveyance step—a position detection step).

Here, the position detection step will be described. FIG. 3 shows a state where the first continuous material member and the second continuous material member 20 are newly conveyed on the downstream conveyer 123. In the state, the downstream end 10E of the first continuous material member 10 is located at an image-taking position (range) of the first camera 141, and the downstream end 20E of the second continuous material member 20 is located at an image-taking position (range) of the second camera 142. In the position detection step, positions of the first continuous material member 10 and the second continuous material member 20 are detected by the above-mentioned position detector 140 in the state shown in FIG. 3.

Figure 4:
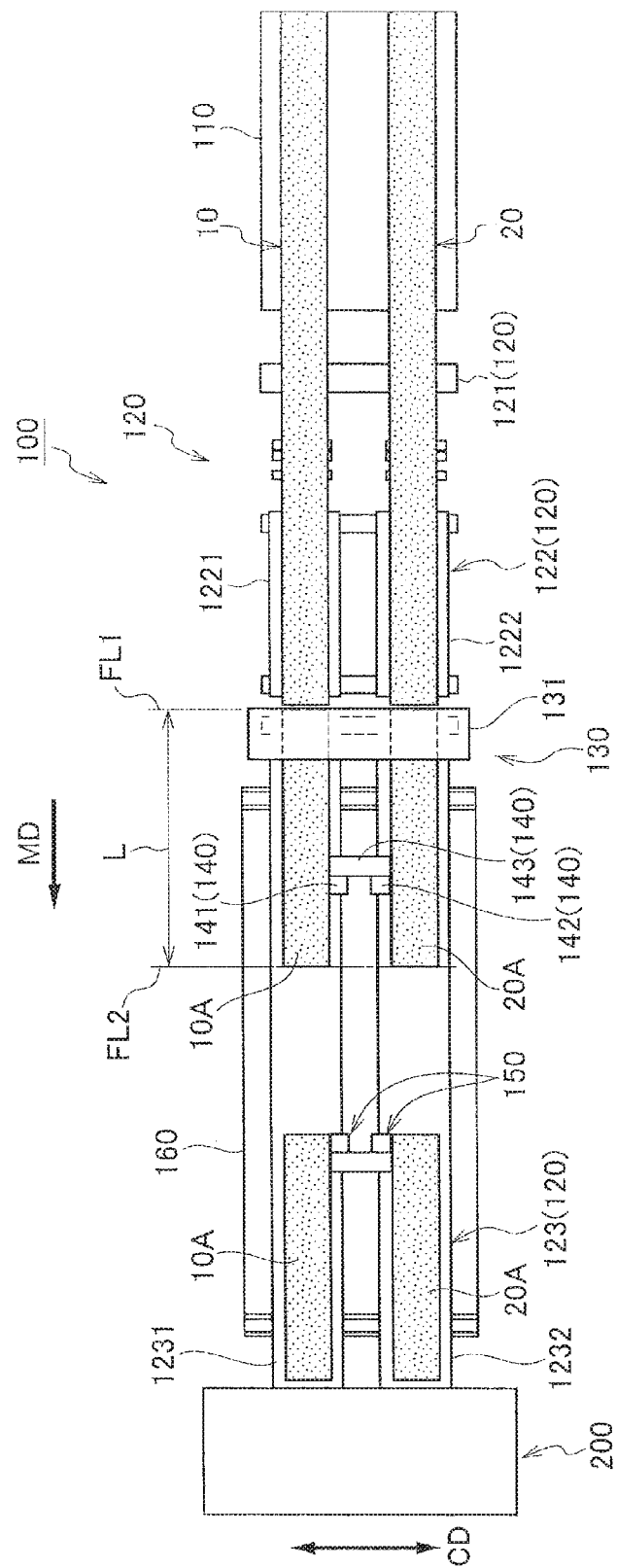
FIG. 4 is a plan view of the supply apparatus (a position adjustment step—a cutting step).

FIG. 4 shows a state where the first continuous material member 10 and the second continuous material member 20 are fed further from the state shown in FIG. 3. The state shown in FIG. 4 is a state where the first continuous material member 10 and the second continuous material member 20 are fed from the state shown in FIG. 1 by the predetermined length L (and then the first material member 10A and the second material member 20A have been cut out).

Here, the position adjustment step will be described. In the position adjustment step, between the state shown in FIG. 1 and the state shown in FIG. 4, the conveyance distances of the first continuous material member 10 and the second continuous material member 20 are adjusted so that the positions of the first continuous material member 10 and the second continuous material member 20 along the conveyance direction MD are located at an identical position to each other. In the present embodiment, the conveyance distances are adjusted based on the positions detected in the position detection step shown in FIG. 3.

For example, if a position of the first continuous material member 10 along the conveyance direction MD is on an upstream side from a position of the second continuous material member 20 along the conveyance direction MD, following controls are made. The controller makes a conveying length of the first downstream conveyer 1231 (or/and the first upstream conveyer 1221) smaller than a conveying length of the second downstream conveyer 1232 (or/and the second upstream conveyer 1222). As the result, the position of the downstream end 10E of the first continuous material member 10 and the position of the downstream end 20E of the second continuous material member 20 are made identical to each other along the conveyance direction MD.

Figure 5:
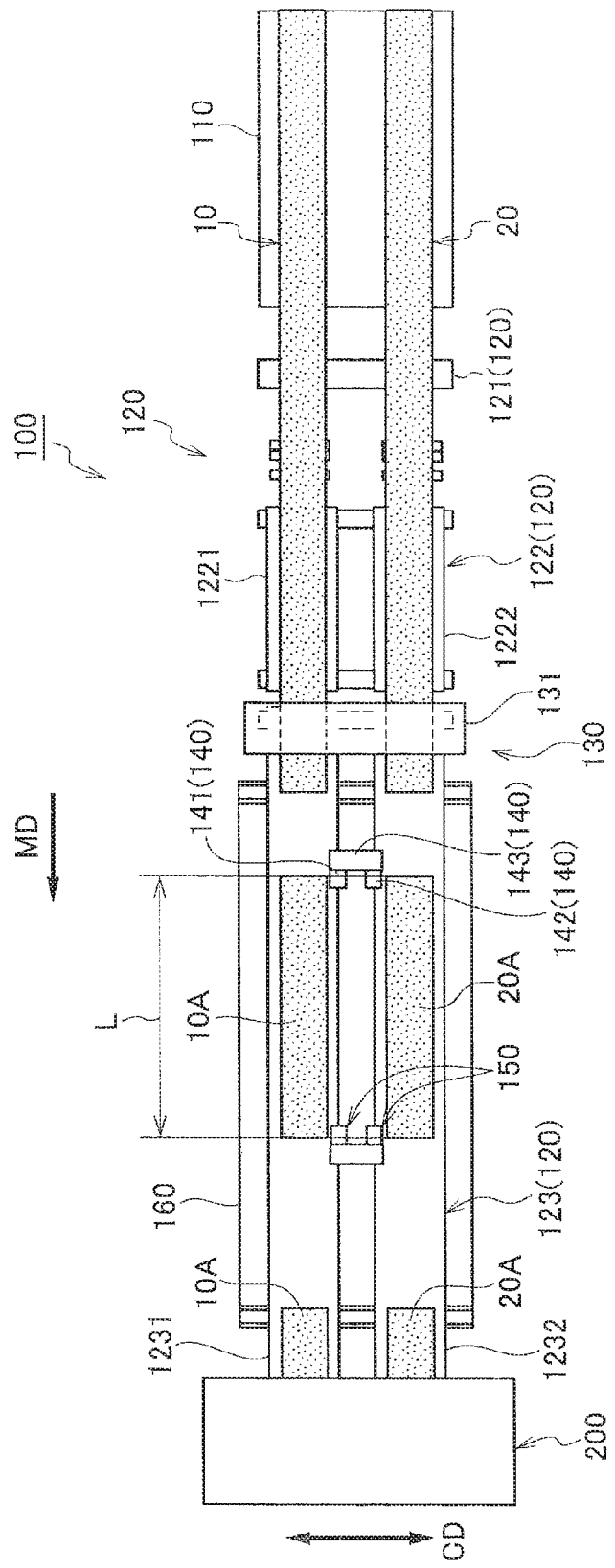
FIG. 5 is a plan view of the supply apparatus (measurement of lengths of material members).

FIG. 5 shows a state where the first material member 10A and the second material member 20A (and the first continuous material member 10 and the second continuous material member 20: this is also the conveyance step) are further conveyed from the state shown in FIG. 4 where the first material member 10A and the second material member 20A are just cut out. In the state shown in FIG. 5, the downstream end of the first material member 10A and the downstream end of the second material member 20A are located at the image-taking position of the supplemental position detector 150. The upstream end of the first material member 10A is located at the image-taking position of the first camera 141, and the upstream end of the second material member 20A is located at the image-taking position of the second camera 142.

The controller can measure a length of the first material member 10A based on the detection result of the supplemental position detector 150 and the detection result of the first camera 141. Similarly, the controller can measure a length of the second material member 20A based on the detection result of the supplemental position detector 150 and the detection result of the second camera 142. For example, it becomes possible to control winding of the first material member 10A and the second material member 20A around the drum 200 based on the measured lengths of the first material member 10A and the second material member 20A.

Note that, with respect to the first material member 10A and the second material member 20A that are cut out in the cutting step, the conveyance adjustment step is done before they are supplied to the drum 200. Specifically, the conveyance adjustment step includes an angle adjustment step for adjusting a sloped angle of the downstream conveyer 123 and a vertical adjustment step for adjusting a vertical position of the downstream conveyer 123.

In the angle adjustment step, the angle of the downstream conveyer 123 is adjusted so that the downstream conveyer 123 is changed from its sloped state to its horizontal state. Before the angle adjustment step, the upstream end of the downstream conveyer 123 is located on an extended line of the conveyance direction of the upstream conveyer 122 in order to be able to receive the first continuous material member 10 and the second continuous material member 20 from the upstream conveyer 122. FIG. 6 shows a state before the angle adjustment step.

After the angle adjustment step, the downstream conveyer 123 is made horizontal. FIG. 7 shows a state after the angle adjustment step. In this state, the upstream end of the downstream conveyer 123 is located beneath the upstream conveyer 122, and the downstream end of the downstream conveyer 123 is located beneath the drum 200.

Note that, in the angle adjustment step, the angle of the downstream conveyer 123 may be adjusted while the first material member 10A and the second material member 20A are being conveyed by the downstream conveyer 123. Alternatively, the angle of the downstream conveyer 123 may be adjusted in a state where the conveyance of the first material member 10A and the second material member 20A by the downstream conveyer 123 is temporarily stopped.

The vertical adjustment step is done after the angle adjustment step. In the vertical adjustment step, the downstream conveyer 123 oriented horizontally is moved upward. FIG. 8 shows a state after the vertical adjustment step, and the first material member 10A and the second material member 20A on the downstream conveyer 123 are contacted with the drum 200. Subsequently, the first material member 10A and the second material member 20A are transferred from the downstream conveyer 123 to the drum 200, and then wound around the drum 200.

Note that, after transferring the first material member 10A and the second material member 20A to the drum 200, a next first material member 10A and a next second material member 20A are formed. Specifically, the downstream conveyer 123 is moved downward, and then the downstream conveyer 123 is returned into its sloped state. Subsequently, the first continuous material member 10 and the second continuous material member 20 are conveyed onto the downstream conveyer 123, and then the next first material member 10A and the next second material member 20A are cut out.

(3) Functions and Advantages

The tire material members (the first material member 10A and the second material member 20A) are configured of rubber material, a carcass ply made from cords, and so on, so that it may shrink after being cut in the conveyance direction MD. Therefore, there may be a case where the length of the first material member 10A and the length of the second material member 20A may not become identical to each other. However, according to the present embodiment, it is possible to make the position of the downstream end 10E of the first continuous material member 10 and the position of the downstream end 20E of the second continuous material member 20 identical to each other while conveying them by the conveyer 120. Therefore, it is possible to make the lengths of the first material member 10A and the length of the second material member 20A identical to each other. Namely, dispersion of the lengths of the tire material members can be restricted.

The adjustment of the conveyance distances of the first continuous material member 10 and the second continuous material member 20 is done while conveying them by the predetermined length L from the cutting position. If it is tried to do the adjustment after conveying them by the predetermined length L, its conveyance process becomes complicated due to inevitable movements of the first continuous material member 10 and the second continuous material member to an upstream side or a downstream side in the conveyance direction MD. However, the conveyance process can be made simplified by dosing the adjustment while conveying them by the predetermined length L.

In addition, since the first material member 10A is attached to one side of the drum 200 along the tire width direction and the second material member 20A is attached to the other side of the drum 200, there may be a concern that kinetic performance and uniformity performance of a manufactured tire may be affected if the length of the first material member 10A and the length of the second material member 20A are different from each other. However, according to the present embodiment, the difference between the length of the first material member 10A and the length of the second material member 20A can be drastically reduced, so that kinetic performance and uniformity performance of a manufactured tire can be restricted from degrading.

The position detector 140 in the present embodiment has the first camera 141 and the second camera 142. By taking images of the first continuous material member 10 and the second continuous material member 20 that are conveyed independently from each other by use of the individual cameras, accuracy of the position detections of the first continuous material member and the second continuous material member 20 can be improved. Therefore, the difference between the length of the first material member 10A and the length of the second material member 20A can be drastically reduced further. In addition, by taking images of the first continuous material member 10 and the second continuous material member 20 by the individual cameras, time required for the position detections can be made shorter than that in a case of taking images by use of a single camera.

Here, the first camera 141 and the second camera 142 are fixed with the support frame 160 together with the conveyer 120. Therefore, it is possible to restrict the positional shifting between the first camera 141 and the second camera 142 and the positional shifting between the first/second cameras 141/142 and the conveyer 120. Therefore, degradation of the accuracy of the position detections due to the positional shifting can be restricted.

The cutter 130 in the present embodiment has the cutter blade 131 that cuts the first continuous material member and the second continuous material member 20 together. Since the first continuous material member 10 and the second continuous material member 20 are cut by the single cutter blade 131, shifting of the cutting position can be restricted more effectively than that in a case of cutting them by individual cutter blades. In addition, time required for cutting can be also shortened.

Note that the functions and the advantages that have been described above can be brought, even if the vertical adjuster 170 and the swing mechanism 180 are not provided. Hereinafter, functions and advantages brought by the vertical adjuster 170 and/or the swing mechanism 180 will be described.

In the present embodiment, the conveyer 120 is moved upward by the vertical adjuster 170 in a state where the conveyer 120 is oriented horizontally. Since the conveyer 120 is moved only vertically in order to contact the tire material members (the first material member 10A and the second material member 20A) with the outer surface of the drum 200, accuracy of a vertical position of the conveyer 120 can be improved more precisely than that in a case where a conveyer is moved vertically while its sloped angle is also adjusted. Therefore, it becomes possible to improve accuracy of a gap between the front end of the conveyer 120 (the downstream conveyer 123) and the drum 200. In addition, the vertical movement of the conveyer 120 can be achieved with a simple mechanism.

In addition, the supply apparatus 100 also has the swing mechanism 180 that is driven independently from the vertical adjuster 170. By the swing mechanism 180, it becomes possible to adjust a position of the downstream conveyer 123 relative to the upstream conveyer 122.

The swing mechanism 180 swings the downstream conveyer 123 between a first position (FIG. 6) at which the upstream end of the downstream conveyer 123 is located on a downstream side of the cutting position and a second position (FIG. 7 and FIG. 8) at which the upstream end of the downstream conveyer 123 is located beneath the cutting position. The first position of the swing mechanism 180 is a position shown in FIG. 2. By the swing mechanism 180, a position of the upstream end of the downstream conveyer 123 located at the first position (a transfer position of the first continuous material member 10 and the second continuous material member 20) and a position of the downstream end of the downstream conveyer 123 located at the second position (a supply position of the first material member 10A and the second material member 20A to the drum 200) can be set at different height levels (vertically different positions).

A certain length of the first continuous material member 10 and the second continuous material member 20 that are generally wound to form a roll-shape is reserved by the feed roller 121 or the like on an upstream side of the upstream conveyer 122. Therefore, the feed roller 121 is disposed at a relatively high position. In the present embodiment, by the swing mechanism 180, the height of the transfer position from the upstream conveyer 122 to the downstream conveyer 123 and the height of the supply position from the downstream conveyer 123 to the drum 200 can be adjusted (can be set at the different heights).

Therefore, it becomes possible to set the transfer position at a relatively high position and set the supply position at a relatively low position. As the result, even if the feed roller 121 is disposed at a relatively high position, it is possible to smoothly convey the first continuous material member 10 and the second continuous material member 20 from the feed roller 121 to the downstream conveyer 123.

Note that, if it is not needed to reserve a certain length of the first continuous material member 10 and the second continuous material member 20, a position of the downstream conveyer 123 may be adjusted only by the vertical adjuster 170 without providing the swing mechanism 180. In addition, in a case where a depressed portion is formed on a floor surface on which the supply apparatus 100 is mounted and the first continuous material member 10 and the second continuous material member 20 that are reserved by the feed roller 121 are accommodated in the depressed portion, it is not needed to dispose the feed roller 121 at a relatively high position. Therefore, a position of the downstream conveyer 123 may be adjusted only by the vertical adjuster 170 without providing the swing mechanism 180.

(4) Other Embodiments

In these manners, the present invention, of course, includes various embodiments that are not described here. Therefore, technical scope of the present invention is determined only based on invention-specifying matters according to the claims that are reasonable from the above descriptions.

For example, the supplemental position detector 150 may be movable in the conveyance direction MD. By changing the position of the supplemental position detector 150, it becomes conformable with various tire sizes. In addition, the position detector 140 may be movable in the conveyance direction MD. Further, the supply apparatus 100 in the above embodiment includes the supplemental position detector 150, but may not include the supplemental position detector 150.

Furthermore, although the above-described functions and advantages by the vertical adjuster 170 and/or the swing mechanism 180 wouldn't be brought, the vertical adjuster 170 and/or the swing mechanism 180 may not be provided necessarily. In this case, the drum 200 may be disposed at a position indicated by dotted lines shown in FIG. 1 and FIG. 2.

Entire contents of a Japanese Patent Application No. 2014-83455 (filed on Apr. 15, 2014) and a Japanese Patent Application No. 2014-83566 (filed on Apr. 15, 2014) are incorporated herein by reference. Although the invention has been described above with reference to certain embodiments of the invention, the invention is not limited to the embodiments described above. Scope of the present invention is determined in the context of the claims. In addition, the features of the embodiments and their modified examples can be adopted in arbitrary combinations with them.

The invention claimed is:

1. An apparatus for supplying tire material members, the apparatus comprising:
    a feeder that feeds out a first continuous material member from which a first material member is to be cut out and a second continuous material member from which a second material member is to be cut out;
    a conveyer that conveys the first continuous material member and the second continuous material member;
    a cutter that cuts the first continuous material member and the second continuous material member at a cutting position along a crossing direction perpendicular to a conveyance direction of the first continuous material member and the second continuous material member every time when the first continuous material member and the second continuous material member are conveyed by a predetermined length;
    a position detector that, prior to cutting by the cutter, detects positions of the first continuous material member and the second continuous material member along the conveyance direction while the first continuous material member and the second continuous material member are conveyed by the predetermined length from the cutting position;
    a position adjuster that includes a controller that compares a length of the first continuous material member along the conveyance direction with, a length of the second continuous material member along the conveyance direction based on a detection result of the positions of the first continuous material member and the second continuous material member by the position detector while the first continuous material member and the second continuous material member are conveyed by the predetermined length from the cutting position, and prior to cutting by the cutter, controls the conveyer to make downstream ends of the first continuous material member and the second continuous material member identical to each other along the conveyance direction based on a comparison result of the lengths of the first continuous material member and the second continuous material member along the conveyance direction; and
    a supplemental position detector that is located downstream from the position detector along the conveyance direction, and detects downstream ends of the first material member cut out from the first continuous material member by the cutter and the second material member cut out from the second continuous material member by the cutter,
    wherein the feeder is adapted to feed out the first continuous material member and the second continuous material member in parallel with each other with a gap between the first continuous material member and the second continuous material member in the crossing direction perpendicular to the conveyance direction such that the first continuous material member and the second continuous material member are not in contact with each other, and
    wherein the position detector also detects upstream ends of the first material member and the second material member when the supplemental position detector detects the downstream ends of the first material member and the second material member.

2. The apparatus for supplying tire material members according to claim 1,
    wherein the position detector has a first camera that takes an image of the downstream end of the first continuous material member, and a second camera that takes an image of the downstream end of the second continuous material member.

3. The apparatus for supplying tire material members according to claim 2,
    wherein the first camera and the second camera are fixed with a support base together with the conveyer.

4. The apparatus for supplying tire material members according to claim 1,
    wherein the cutter is disposed over the first continuous material member and the second continuous material member along the crossing direction, and has a cutter blade for cutting the first continuous material member and the second continuous material member.

5. A method for supplying tire material members, the method comprising:
    feeding out a first continuous material member from which a first material member is to be cut out and a second continuous material member from which a second material member is to be cut out;
    conveying the first continuous material member and the second continuous material member that are fed out;

prior to cutting by the cutter, detecting positions of the first continuous material member and the second continuous material member along a conveyance direction while the first continuous material member and the second continuous material member are conveyed by the predetermined length from a cutting position;

comparing a length of the first continuous material member along the conveyance direction with a length of the second continuous material member along the conveyance direction based on a detection result of the positions the first continuous material member and the second continuous material member;

while the first continuous material member and the second continuous material member are conveyed by the predetermined length from the cutting position, and prior to cutting by the cutter, making downstream ends of the first continuous material member and the second continuous material member identical to each other along the conveyance direction based on a comparison result of the lengths of the first continuous material member and the second continuous material member along the conveyance direction; and cutting the first continuous material member and the second continuous material member every time when the first continuous material member and the second continuous material member are conveyed by a predetermined length; and detecting downstream and upstream ends of the first material member cut out from the first continuous material member and downstream and upstream ends of the second, material member cut out from the second continuous material member after the cutting, wherein in the feeding step the first continuous material member and the second continuous material member are fed out in parallel with each other with a gap between the first continuous material member and the second continuous material member in the crossing direction perpendicular to the conveyance direction such that the first continuous material member and the second continuous material member are not in contact with each other.

\* \* \* \* \*